United States Patent
Collins et al.

(10) Patent No.: US 9,141,943 B2
(45) Date of Patent: Sep. 22, 2015

(54) PROVIDING MERGED PRESENCE CALCULATION INFORMATION BASED ON ANALOGOUS MULTI-UTILITY EVENTS

(71) Applicant: Avaya Inc., Basking Ridge, NJ (US)

(72) Inventors: James Collins, Galway (IE); Ciaran Agnew, Galway (IE)

(73) Assignee: Avaya Inc., Basking Ridge, NJ (US)

( * ) Notice: Subject to any disclaimer, the term of this patent is extended or adjusted under 35 U.S.C. 154(b) by 344 days.

(21) Appl. No.: 13/622,231

(22) Filed: Sep. 18, 2012

(65) Prior Publication Data

US 2014/0082098 A1    Mar. 20, 2014

(51) Int. Cl.
*G06F 15/16* (2006.01)
*G06Q 10/10* (2012.01)

(52) U.S. Cl.
CPC .................................. *G06Q 10/109* (2013.01)

(58) Field of Classification Search
CPC ........................... H04L 51/043; G06Q 10/109
USPC ....................................................... 709/206
See application file for complete search history.

(56) References Cited

U.S. PATENT DOCUMENTS

| | | | |
|---|---|---|---|
| 7,536,437 B2 | 5/2009 | Zmolek | |
| 2005/0262195 A1* | 11/2005 | Ono et al. | 709/203 |
| 2008/0148154 A1* | 6/2008 | Burrell et al. | 715/733 |
| 2009/0198638 A1* | 8/2009 | Sakurai | 706/47 |

FOREIGN PATENT DOCUMENTS

EP          2363984 A2     9/2011

OTHER PUBLICATIONS

Lync FAQ, Questions about Presence, http://office.microsoft.com/en-us/communicator-help/faq-about-presence-contacts-and-instant-messaging-HA101832590.asp#_Toc314066150, 2010.

* cited by examiner

*Primary Examiner* — Phuoc Nguyen
(74) *Attorney, Agent, or Firm* — Sheridan Ross P.C.

(57) ABSTRACT

Methods and systems are disclosed for collecting presence information from multiple utilities associated with a user and creating merged presence calculation information where events are determined to be analogous in content. The analogous content may relate to one or more of timing, context, user information, location, and the like. More specifically, email out-of-office and calendar events may be treated as analogous events. From the analogous events, merged presence calculation information is created and then provided to a presence server for an efficient aggregate presence calculation.

20 Claims, 3 Drawing Sheets

PROVIDING MERGED PRESENCE CALCULATION INFORMATION BASED ON ANALOGOUS MULTI-UTILITY EVENTS

FIELD OF THE DISCLOSURE

The present disclosure is generally directed toward communications and more specifically toward providing presence calculation information determined from multi-utility analogous events.

BACKGROUND

"Presence" is well known in the telecommunications industry. Presence and presence information relate to a person having multiple devices with multiple communication paths and a user's preference or preferred device of availability. "Presence information" typically refers to any information associated with a network node and/or endpoint device, such as a communications device, that is in turn typically associated with a person or entity. Examples of presence information include registration information under the Session Initiation Protocol (SIP), information regarding the accessibility of the endpoint device, the endpoint(s) telephone number or address, the recency of use of the endpoint device by the person, recency of authentication by the person to a network component, and the preferences of the user, such as contact mode preferences or profiles. Presence information can be user configurable, i.e., the user can configure the number and type of communication and message devices (endpoints) with which they can be contacted and define profiles that govern the communication and message options presented to the incoming contact or in specified factual situations or sets of facts. By identifying a pre-defined set of facts, a profile can be accessed and followed to direct the contact to the user/preferred device.

Typically, presence information is communicated and updated via one or more messages exchanged, for example, between one or more endpoints and/or one or more servers. In calculating a presence for one or more endpoints and/or entities, a presence server may collect presence information from a number of sources. Among these sources, the presence server may collect presence information from calendar servers, email servers, as well as server applications.

Calendar applications can be used to schedule meetings or other types of calendar events along with a time-specific context. In addition, these meetings, or events, may be associated with a selected state of the user (e.g., Busy, Free, Tentative, Out-of-Office, etc). For example, a user may be invited to attend an important meeting, which, when accepted may alter the user's associated state (e.g., to Busy, Out-of-Office, Free, etc.) for the scheduled time of the meeting. In another example, a user may block out periods of time in a calendar application to reserve "Free" or "Busy" periods of time that may be used to alter future invitations and/or scheduling. In any event, the presence server can collect this calendar information associated with the user to calculate a presence associated with an endpoint and/or entity via a presence aggregation algorithm. Along with the calendar information, the presence server may collect email information to determine presence.

Email applications can be used to determine a user's availability and/or activity. For instance, email applications can include an "Out-of-Office" utility to notify others that a user may be "Out-of-Office" when an email is received by the user. The presence server can collect the email information to determine presence for an endpoint and/or entity. However, in calculating the presence for an individual who is associated with a number of endpoints, the presence server must consider a number of sources, states, and contexts, especially in the collection of information. In other words, all of the sources are treated as unique and are calculated accordingly. In some cases the presence sources may be associated with a priority that can be used to affect a resultant presence calculation. As can be expected, the algorithms applied in calculating presence for all of the individuals in an organization, group, enterprise, or network can be processor intensive and time consuming.

SUMMARY

It is with respect to the above issues and other problems that the embodiments presented herein were contemplated. In general, embodiments of the present disclosure provide methods, devices, and systems for providing merged presence calculation information, obtained from analogous multiple utility ("multi-utility") events. In some embodiments, the merged presence calculation information may be used by a presence server in determining a resultant presence for one or more endpoints and/or utilities. Among other things, the multi-utility events may include calendar events and email out-of-office events.

The merged presence calculation information may be determined by collecting presence information for each of the multi-utility events, comparing selected presence information from each of the events to one another, determining any matches in content (e.g., between one or more of event and user content, state, overlap, timing, attendance, busyness, etc.), and then determining whether the events qualify as analogous events for determining a resultant presence (e.g., as directed via rules, thresholds, and the like). As disclosed herein, certain sources of presence information (e.g., calendar and email out-of-office events, etc.) may be treated as analogous for the purposes of determining presence calculation information. Utilizing this merged approach reduces the number of unique sources that are considered by a presence server and/or aggregator in calculating a resultant presence. Accordingly, the resultant presence calculations are performed more efficiently (e.g., by saving processing time and resources, etc.) utilizing the merged presence calculation information in lieu of unmerged unique source presence information.

When calculating presence of a user, for example, a presence service may be configured to collect presence information from one or more devices and/or utilities associated with a given user (e.g., telephone, video recording device, computer, mobile device, instant messaging applications, telephony applications, email out-of-office/calendar software applications, and the like). The presence service typically collects the presence information from a number of channels, sources, and/or streams. Once the presence information is collected for each user, the presence service may employ the use of an aggregator in calculating a resultant presence state. In general, the aggregator treats and analyzes the presence information collected from each channel, source, and/or stream as unique information and then calculates the resultant presence by applying a sophisticated presence algorithm executed by a processor. However, treating all of the collected presence information as unique does not take into account any overlap of possible analogous presence information. As such, the aggregator must include all of the collected presence information in determining the resultant presence calculation.

In some embodiments, a merged multi-utility presence ("MMP") module is described that may be configured to determine analogous presence events and create merged presence calculation information. This MMP module may be applied before presence information is provided to a presence service. In one embodiment, the MMP module may create merged presence calculation information that can be used by a presence service and/or aggregator in determining a resultant presence state. As can be appreciated, the merged presence calculation information may allow the aggregator to treat two or more events containing presence information as merged information when the two or more events are deemed to be analogous events. This information may be structured as merged presence calculation information, in which case, the MMP module may create presence calculation data that is used by an aggregator in determining resultant presence state. In some embodiments, the presence calculation data itself may not necessarily reflect presence information. In this case, the presence calculation data may characterize details of the analogous presence information that can be used by an aggregator. For instance, the presence calculation data may be digitally represented and/or output to provide presence information when further calculated by the aggregator. Additionally, or alternatively, the data itself may represent pre-calculated merged presence information (e.g., from two or more sources, etc). This pre-calculated merged presence information may be processed by an aggregator and/or presence service as if the merged information was obtained from a single collection point (e.g., source, channel, stream, device, etc.). In any event, by providing a reduced set of information to the aggregator, the resultant presence calculation can be made more efficiently than the conventional approach of treating all collected presence information as unique.

In accordance with embodiments of the present disclosure, the MMP module may be configured to simplify the presence information processed by the resultant presence calculation algorithm by treating email out-of-office and calendar events as analogous events. In one embodiment, the present disclosure anticipates analyzing calendar events and a user's out-of-office utility for analogous presence information. For example, a user may be using an out-of-office utility in an email context, among other things, to provide automatic email replies in response to received email messages. Typically, the email out-of-office utility is configured to provide these emails during a specific time period, or at least while the utility/service is enabled. In some instances, the out-of-office utility may be controlled on a per email account basis. Additionally, or alternatively, the out-of-office utility may reside as processor executable software in an email application and/or an email server. In any event, the MMP module may determine the out-of-office details associated with the utility (e.g., state—active/inactive, start time, end time, duration, location, user information, message content, linked information, etc.). This information may be stored and/or compared to other collected presence information for possible matches.

In one embodiment, the MMP module may be configured to determine the details associated with calendar events in creating merged presence calculation information. Among other things, the MMP module may determine, but is not limited to, data associated with one or more events such as, event times, duration, location, invitees, attendees, user information, content, and/or links etc. As can be appreciated the calendar information may reside in a software application and/or in a calendar server. In some embodiments, a calendar server and an email server may be collocated. In other embodiments, the calendar server and the email server may be separate. In any case, the MMP module is configured to analyzed and determine analogous events using email out-of-office utility and calendar events. The information obtained from analyzing calendar events may be stored and/or compared to other collected presence information, such as an email out-of-office utility, to determine possible matches. In one embodiment, the matched information may be merged as presence calculation information to determine a resultant presence. Additionally, or alternatively, the matched information may be analyzed for analogous event criteria to determine whether the matched information qualifies as merged presence calculation information for determining a resultant presence.

The MMP module may determine matches in email out-of-office and calendar events based on stored rules. For example, the MMP module may observe that a German resident user's out-of-office utility was activated on a Monday and is configured to deactivate on a Friday. The MMP module, in this example, may also determine that a user is in several meetings on Tuesday, Wednesday, and Thursday of the same week with an associated location of Cork, Ireland. Rather than provide presence information to an aggregator for all of the separate calendar events, the MMP module may follow rules to provide merged presence calculation information for a duration that comports with the active out-of-office utility. It is anticipated that the MMP module may calculate merged presence calculation information before publishing it to the presence aggregation module, or aggregator, within the presence server. It should be appreciated that the MMP module may use rules that consider various levels of detail associated with email out-of-office and calendar events, and this example is provided as one of many possible implementations.

In some embodiments, the presence information may be obtained by utilizing a presence script via an application programming interface ("API"). Before the script can be applied, the server version may be determined to ensure compatibility. It is an aspect of the present disclosure to determine the compatibility of a server's version and also to determine whether the script may be applied in obtaining presence. Additionally, or alternatively, once the compatibility of the server version has been determined a memory may be maintained and/or updated. Among other things, this database of user's and corresponding server version compatibility may be used to determine whether a presence script may be used to collect presence information regarding a user. For example, calendar and email out-of-office events may be collected for a client/server collaborative application product, or equivalent, such as Microsoft® Exchange Server. In this example, the server version may be determined to establish whether or not presence information collection is available via a specific API. As can be appreciated, the present disclosure may apply to a number of different developers of calendar/email server products, applications, client/server presence detection, and the like.

The phrases "at least one", "one or more", and "and/or" are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together.

The term "a" or "an" entity refers to one or more of that entity. As such, the terms "a" (or "an"), "one or more" and "at least one" can be used interchangeably herein. It is also to be noted that the terms "comprising," "including," and "having" can be used interchangeably.

The term "automatic" and variations thereof, as used herein, refers to any process or operation done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material."

The term "computer-readable medium" as used herein refers to any tangible storage that participates in providing instructions to a processor for execution. Such a medium may take many forms, including but not limited to, non-volatile media, volatile media, and transmission media. Non-volatile media includes, for example, NVRAM, or magnetic or optical disks. Volatile media includes dynamic memory, such as main memory. Common forms of computer-readable media include, for example, a floppy disk, a flexible disk, hard disk, magnetic tape, or any other magnetic medium, magneto-optical medium, a CD-ROM, any other optical medium, punch cards, paper tape, any other physical medium with patterns of holes, a RAM, a PROM, and EPROM, a FLASH-EPROM, a solid state medium like a memory card, any other memory chip or cartridge, or any other medium from which a computer can read. When the computer-readable media is configured as a database, it is to be understood that the database may be any type of database, such as relational, hierarchical, object-oriented, and/or the like. Accordingly, the disclosure is considered to include a tangible storage medium and prior art-recognized equivalents and successor media, in which the software implementations of the present disclosure are stored.

The terms "determine," "calculate," and "compute," and variations thereof, as used herein, are used interchangeably and include any type of methodology, process, mathematical operation or technique.

The term "module" as used herein refers to any known or later developed hardware, software, firmware, artificial intelligence, fuzzy logic, or combination of hardware and software that is capable of performing the functionality associated with that element. Also, while the disclosure is described in terms of exemplary embodiments, it should be appreciated that individual aspects of the disclosure can be separately claimed.

The term "server" as used herein should be understood to include a PBX, an enterprise switch, an enterprise server, or other type of telecommunications system switch or server, as well as other types of processor-based communication control devices such as media servers (i.e., email servers, voicemail servers, web servers, and the like), computers, adjuncts, etc.

BRIEF DESCRIPTION OF THE DRAWINGS

The present disclosure is described in conjunction with the appended figures.

DETAILED DESCRIPTION

The ensuing description provides embodiments only, and is not intended to limit the scope, applicability, or configuration of the claims. Rather, the ensuing description will provide those skilled in the art with an enabling description for implementing the embodiments. It being understood that various changes may be made in the function and arrangement of elements without departing from the spirit and scope of the appended claims.

Figure 1:
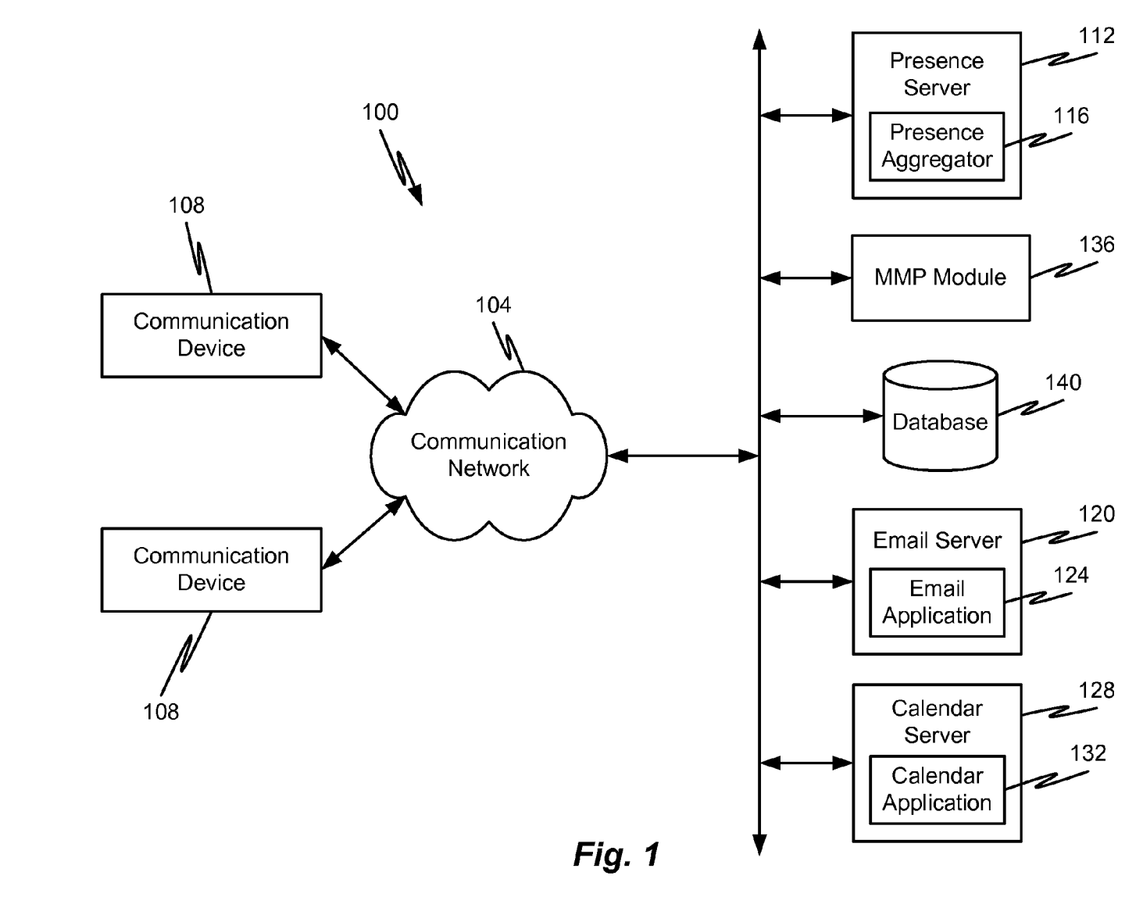
FIG. 1 is a block diagram of a communication system in accordance with embodiments of the present disclosure.

FIG. 1 shows an illustrative embodiment of a communication system 100 in accordance with at least some embodiments of the present disclosure. The communication system 100 generally comprises a communication network 104, one or more communication devices 108, a presence server 112 including a presence aggregator 116, an email server 120 including an email application 124, a calendar server 128 including a calendar application 132, a merged multi-utility ("MMP") module 136, and a database 140.

In accordance with at least some embodiments of the present disclosure, the communication network 104 may comprise any type of known communication medium or collection of communication media and may use any type of protocols to transport messages between endpoints. The communication network 104 may include wired and/or wireless communication technologies. The Internet is an example of the communication network 104 that constitutes an Internet Protocol (IP) network consisting of many computers, computing networks, and other communication devices located all over the world, which are connected through many telephone systems and other means. Other examples of the communication network 104 include, without limitation, a standard Plain Old Telephone System (POTS), an Integrated Services Digital Network (ISDN), the Public Switched Telephone Network (PSTN), a Local Area Network (LAN), a Wide Area Network (WAN), a Session Initiation Protocol (SIP) network, a Voice over IP (VoIP) network, a cellular network, and any other type of packet-switched or circuit-switched network known in the art. In addition, it can be appreciated that the communication network 104 need not be limited to any one network type, and instead may be comprised of a number of different networks and/or network types. Moreover, the communication network 104 may comprise a number of different communication media such as coaxial cable, copper cable/wire, fiber-optic cable, antennas for transmitting/receiving wireless messages, and combinations thereof.

The communication devices 108 may comprise any type of known communication equipment or collection of communication equipment. Examples of a suitable communication device 108 include, but are not limited to, a personal computer, laptop, Personal Digital Assistant (PDA), cellular phone, smart phone, telephone, or combinations thereof. In general each communication device 108 may be adapted to support video, audio, text, and/or data communications with other communication devices 108 as well as one or more module 136, and/or servers 112, 120, 128. The type of medium used by the communication device 108 to communicate with other communication devices 108, module 136, or servers 112, 120, 128 may depend upon the communication applications available on the communication device 108. The communication devices 108 may correspond to user communication devices.

A server 112, 120, and/or 128 in accordance with embodiments of the present invention, may comprise a communication server or other dedicated processor that functions to provide services to client devices (e.g., communication devices 108). The calendar server 128 may work in conjunction with the email server 120 and presence server 112 to provide scheduling, presence, and resource management capabilities to the communication devices 108. In other words, a user of the communication device 108 may employ various applications on the servers 112, 120, and 128 to provide presence information associated with the user.

The presence of one or more users can be determined using the presence aggregator 116 maintained in association with the presence server 112. The presence aggregator 116 is operable to monitor the presence of participants using various known presence tracking methods. For example, the presence aggregator 116 may employ SIP presence awareness to identify if and by what medium a participant is available. Examples of SIP presence tracking are discussed in U.S. Patent App. No. 2003154293 to Zmolek, the entire contents of which are hereby incorporated herein by reference, where SIP presence information is tagged with a classification tag that show details of the presence information.

Additionally, in other embodiments, the presence aggregator 116 may be able to determine the presence, and possible availability, of a user based on collecting presence information obtained from a number of channels, sources, and/or streams and calculating a resultant presence state for the user. This number of channels, sources, and/or streams may include, but is not limited to, presence information associated with user provided data, device information (e.g., state, location, settings, preferences, and the like), application specific data (e.g., calendar events, tasks, reminders, email preferences, utilities, etc.), enterprise information, and/or business rules. The presence information may either be pushed from the presence server 112 to a communication device 108 when a change in a user's presence is identified or pulled by the communication device 108 from the presence server 112 when such presence data is desired, or vice-versa.

It is an aspect of the present disclosure that the email server 120 may employ an email application 124 with an out-of-office utility. The out-of-office utility may be configured to provide automatic email replies in response to received email messages. In some cases, the email out-of-office utility may provide these emails during a specified time period, or for as long as the utility/service is enabled. The out-of-office utility may be controlled on a per email account basis. Additionally, or alternatively, the out-of-office utility may reside as processor executable software in the email application 124 and/or an email server 120. The email application 124 may reside on a user's communication device 108.

In one embodiment, the calendar server 128 employs a calendar application 132 that maintains schedules of various users in the system 100. The calendar application 132 may be accessed by each of the communication devices 108 separately to view a particular user's calendar. A user can access the calendar application 132 to determine availability for him/herself as well as other participants. Each user's schedule may be stored on the calendar server 128 or in the database 140. When a user wants to view or retrieve information related to his/her or another participant's schedule, the calendar application 132 can retrieve the requested schedule and provide the same to the requesting user. The calendar application 132 is useful for determining a participant's availability at some point in the future. Based on the availability of a participant at some point in the future, a meeting may be scheduled using the calendar application 132. In some embodiments, the email server 120 and the calendar server 128 may be the same server.

In some embodiments, the MMP module 136 may be employed to analyze presence information from the email server 120 and the calendar server 128, and/or their corresponding applications 124, 132, for analogous events. Upon detecting analogous events, the MMP module 136 may create merged presence calculation information. This merged presence calculation information may be used by the presence aggregator 116 to calculate a resultant presence state for an associated user. In some embodiments, the MMP module 136 may intercept presence information requests made by a communication device 108 via the presence server 112. Additionally, or alternatively, the MMP module may intercept presence information output from the email server 120 and/or the calendar server 128. In one embodiment, the MMP module 136 may be configured to act as an intermediary between the presence server 112 and the email server 120 and/or the calendar server 128. Additionally, or alternatively, the MMP module 136 may be part of the presence server 112.

It should be emphasized that the configuration of the servers 112, 120, 128, user communication devices 108, and other elements as shown in FIG. 1 is for purposes of illustration only and should not be construed as limiting the invention to any particular arrangement of elements.

Figure 2:
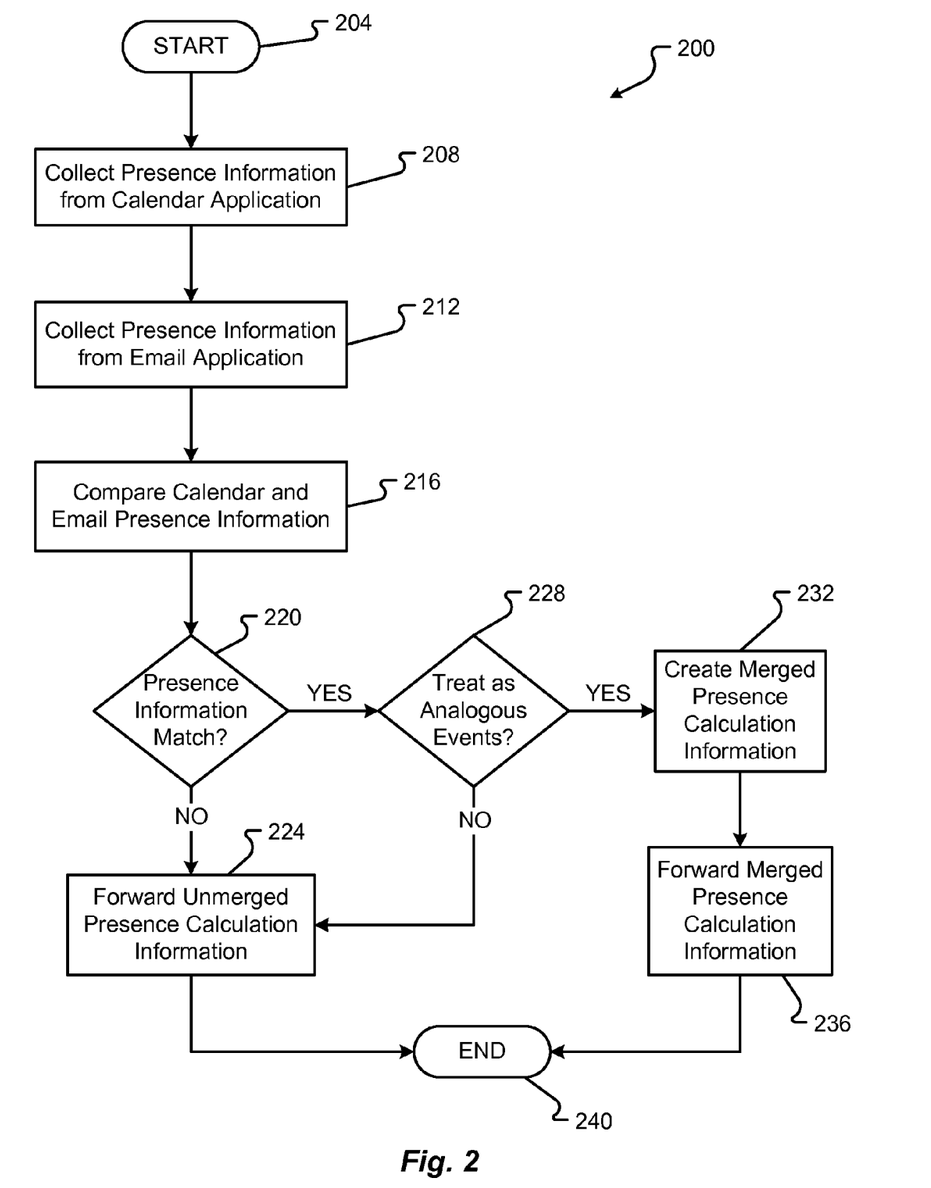
FIG. 2 is a first flow diagram depicting a method of providing merged presence calculation information in accordance with embodiments of the present disclosure.

Referring now to FIG. 2, a first flow diagram is provided in accordance with embodiments of the present disclosure depicting a method 200 of providing merged presence calculation information. The method 200 begins at step 204 and proceeds with the MMP module 136 collecting presence information from the calendar application 132 (step 208). During this collection of presence information, the MMP module 136 may observe meetings, events, status, context, and associated information. It is anticipated that the MMP module 136 may be configured to collect the presence information for one or more users with associated calendar information. In some embodiments, this collected presence information may be stored in a memory associated with the MMP module 136 and/or the database 140. Additionally, or alternatively, the MMP module 136 may be configured to determine details regarding the calendar presence information such as times, durations, locations, invitees, attendees, user information, content, and/or links etc.

The method 200 continues by collecting presence information from the email application 124 (step 212). In some embodiments, the MMP module 136 may be configured to collect presence information from an associated email out-of-office utility. For example, the collected presence information may include one or more details associated with the out-of-office utility such as state (e.g., active, inactive, timed delay, etc.), start time, end time, duration, location, user information, message content, linked information, context, and the like. As can be appreciated, the collection of presence information from the calendar application 132 and the email application 124 may occur in parallel. In other words, the collection of presence information from the calendar application 132 and the email application 124 may be performed in sequence or in parallel based on timing and/or processor performance requirements.

Next, the MMP module 136 may compare the presence information collected from the calendar application to the presence information collected from the email application, or out-of-office utility (step 212). In accordance with embodiments of the present disclosure, a comparison of presence information may be initiated by determining that an email out-of-office utility may be active for a specific time period.

However, other rules (e.g., location-based rules, email activity rules, user settings, administrative settings, business rules, etc.) may be used, in addition or in the alternative, to determine when the MMP module 136 can compare presence calculation information for two or more utilities, such as calendar events and email out-of-office utilities. For instance, it may be determined that the email out-of-office utility will be active in one week, for a 3-day duration, with a message stating that an associated user will be in Paris, France. Based on the state, and even the duration, of the email out-of-office utility, the MMP module 136 may be caused to compare the presence information collected from the calendar application with the email out-of-office utility presence information collected. In some embodiments, the MMP module 136 may be caused to make a comparison of collected information based on determining that an update has been made to presence information in either of the utilities (e.g., the calendar and email application). In some cases, this update may be made automatically, via a communication device 108, server 112, 120, 128, and/or based on stored rules.

After the collected presence information is compared, the method 200 continues by determining whether any presence information details match (step 220). Matches may include single instance matching, multiple instance matching, exact instance matching, temporal matches, and/or combinations thereof. For example, an email out-of-office utility may be configured as "active" during a time period that a calendar event is scheduled. In some embodiments, this overlap in temporal content may be considered as a match by the MMP module 136. In other embodiments, the temporal match may be coupled with other information before it may qualify as a match. The matching criteria, thresholds, and the like may be governed by rules. Although presence information may be considered to match, one utility may have a higher priority than another. For instance, the out-of-office utility presence information may take priority over the calendar event presence information.

In the event that no match is determined, the method 200 continues by forwarding the unmerged presence information to the presence server 112 (step 224). In some embodiments, the MMP module 136 may be configured to act as an intermediary between the presence server 112 and the email server 120 and/or the calendar server 128. For example, the presence server 112 may request a presence from the email server 120 and/or calendar server 128 via the MMP module 136. Additionally, or alternatively, the MMP module 136 may be configured to withdraw from acting as the intermediary when no presence information matches between the email out-of-office utility and the calendar application. The MMP module 136 may allow the email out-of-office utility and the calendar application to report the presence information directly to the presence server 112. In one embodiment, the MMP module 136 may still act as an intermediary to provide presence information, in an unmerged state, to the presence server 112 even when no match is detected. Once the presence information is forwarded, the method 200 may end (step 240).

On the other hand, if presence information is determined to match, the method 200 continues by determining whether to treat the corresponding events as analogous events (step 228). Treating the events as analogous may depend on the level of similarity between the email out-of-office utility information collected and the calendar event details. This similarity may be defined by predetermined rules and/or thresholds. In the event that the presence information details do not contain the requisite similarity, as predetermined, the method may continue at step 224.

The method 200 may continue when the details associated with the out-of-office utility and the calendar events are determined to be similar by creating merged presence calculation information (step 232). In some embodiments, the merged presence calculation information may include an interpretation of the presence information collected from the analogous events presence calculation information. The calculation information may be used by the presence aggregator 116 to determine a presence state. In other embodiments, the method 200 may determine that the analogous events provide redundant presence information. As such, at least one instance of the redundant presence information can be dropped from the merged presence calculation information.

Once the merged presence calculation information is created, the method 200 continues by forwarding the created information to the presence server 112. It is an aspect of the present disclosure that the presence aggregator 116 may use the merged presence calculation information to generate a resultant presence state for at least one user. Because the MMP module 136 treats certain presence information matches as analogous events (e.g., by removing any redundant calculation data), the presence aggregator 116 can consider truly unique presence information in determining a resultant presence state. In some embodiments, the presence information associated with a higher priority may be provided to the presence server 112 and/or presence aggregator 116. After the merged presence calculation information has been forwarded, the method 200 ends (step 240).

Figure 3:
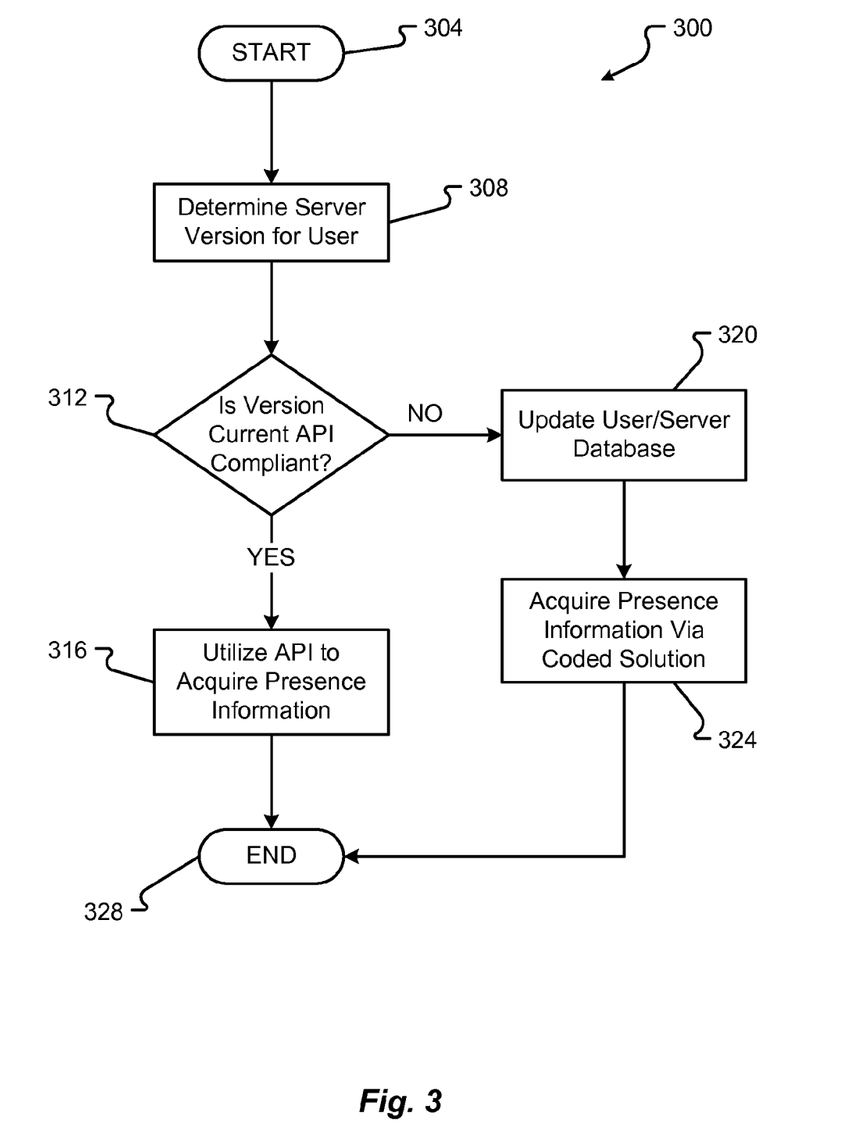
FIG. 3 is a second flow diagram depicting a method of determining and updating associated server versions in obtaining presence information in accordance with embodiments of the present disclosure.

FIG. 3 shows a second flow diagram depicting a method 300 of determining and updating associated server versions in obtaining presence information in accordance with embodiments of the present disclosure. The method 300 begins at step 304 and proceeds by determining the server version associated with a particular user (step 308). In one embodiment, the server version for a given user may be acquired via a lightweight directory access protocol ("LDAP"). For example, presence information may be acquired via Microsoft® Exchange web services. Exchange users can be hosted on multiple exchange servers. These multiple exchange servers may be running various versions of server software. In some cases, one or more exchange servers may not support Microsoft® Exchange web services. In some embodiments, the server version may be determined by using a user's email address in conjunction with the LDAP.

The method 300 continues by determining whether the server version is compliant with a current presence application programming interface ("API") version (step 312). In one embodiment, the current API version may be compared for a match with the server version in the attribute data stored in the LDAP. Additionally, or alternatively, the server version may be determined by applying a test function/script used to determine whether the server version yields an output commensurate with a current API.

In the event that the server version is determined to be compliant with the current API, the method 300 may continue by using a current API script to acquire presence information (step 316). It is anticipated that the presence information may be obtained as disclosed herein. In some embodiments, the presence information may be obtained by an MMP module 136. Additionally, or alternatively, the MMP module 136 may create merged presence calculation information based on this obtained presence information. In some cases, a user's record may be updated to indicate that the associated server version is detected as compliant with the current presence API script. This record may be stored in a memory, or database 140, that is associated with the user. After obtaining the presence information utilizing the current API script, the method 300 ends (step 328).

If the server version does not comply with the current API script, the method 300 continues by updating the user/server record to reflect this determination (step 320). This record may be stored in an associated memory, or database 140. Because the current API script may not adequately collect presence information with an incompatible server version, the method 300 may continue by acquiring presence information via an alternative coded solution (step 324). In some cases, the alternative coded solution may be designed to a basic, or low-level, version of the exchange server. In other embodiments, one or more coded solutions may exist that can be applied to obtain the presence information in accordance with a matched server version. Once the presence information is obtained, the method 300 ends (step 328).

In the foregoing description, for the purposes of illustration, methods were described in a particular order. It should be appreciated that in alternate embodiments, the methods may be performed in a different order than that described. It should also be appreciated that the methods described above may be performed by hardware components or may be embodied in sequences of machine-executable instructions, which may be used to cause a machine, such as a general-purpose or special-purpose processor (GPU or CPU) or logic circuits programmed with the instructions to perform the methods (FPGA). These machine-executable instructions may be stored on one or more machine readable mediums, such as CD-ROMs or other type of optical disks, floppy diskettes, ROMs, RAMs, EPROMs, EEPROMs, magnetic or optical cards, flash memory, or other types of machine-readable mediums suitable for storing electronic instructions. Alternatively, the methods may be performed by a combination of hardware and software.

Specific details were given in the description to provide a thorough understanding of the embodiments. However, it will be understood by one of ordinary skill in the art that the embodiments may be practiced without these specific details. For example, circuits may be shown in block diagrams in order not to obscure the embodiments in unnecessary detail. In other instances, well-known circuits, processes, algorithms, structures, and techniques may be shown without unnecessary detail in order to avoid obscuring the embodiments.

Also, it is noted that the embodiments were described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in the figure. A process may correspond to a method, a function, a procedure, a subroutine, a subprogram, etc. When a process corresponds to a function, its termination corresponds to a return of the function to the calling function or the main function.

Furthermore, embodiments may be implemented by hardware, software, firmware, middleware, microcode, hardware description languages, or any combination thereof. When implemented in software, firmware, middleware or microcode, the program code or code segments to perform the necessary tasks may be stored in a machine readable medium such as storage medium. A processor(s) may perform the necessary tasks. A code segment may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

While illustrative embodiments of the disclosure have been described in detail herein, it is to be understood that the inventive concepts may be otherwise variously embodied and employed, and that the appended claims are intended to be construed to include such variations, except as limited by the prior art.

What is claimed is:

1. A method, comprising:
    collecting presence information from a first utility and a second utility associated with a user, wherein the presence information comprises time-based data;
    comparing the first utility presence information with the second utility presence information;
    determining, as a result of the comparison, to treat the first utility presence information and the second utility presence information as different or analogous events, wherein the analogous events provide redundant presence information; and
    selecting, via a processor, at least one instance of the redundant presence information to drop from a subsequent presence aggregation calculation for the user.

2. The method of claim 1, wherein only unique presence information from the redundant presence information is maintained for the subsequent presence aggregation calculation, the method further comprising:
    forwarding the unique presence information to a presence aggregator, wherein the presence aggregator is configured to calculate a resultant presence state for the user with the unique presence information and information collected from one or more other sources.

3. The method of claim 1, wherein the first utility presence information is associated with a first priority, and wherein the second utility presence information is associated with a second priority.

4. The method of claim 3, wherein selecting the at least one instance of the redundant presence information to drop is at least partially based on the first priority and the second priority.

5. The method of claim 1, wherein the first utility is an email application and the second utility is a calendar application.

6. The method of claim 5, wherein the email application is an email out-of-office utility, and wherein the calendar application includes one or more scheduled calendar events.

7. The method of claim 6, wherein the match is detected between the first utility and the second utility presence information when the email out-of-office utility is active during at least a portion of the one or more scheduled calendar events.

8. The method of claim 6, wherein determining to treat the matching presence information as analogous events further comprises:
    analyzing the matching presence information based on rules stored in a memory, the rules configured to provide qualification criteria for analogous events.

9. The method of claim 1, wherein before collecting presence information from the first and second utilities the method further comprises:

determining whether a server version associated with the user is compatible with a first presence information collection script; and updating a memory location associated with the user to reflect the determined server version.

10. The method of claim 9, wherein upon determining that the server version is compatible with the first presence information collection script, the method further comprises:

applying the first presence information collection script to collect the presence information for the user.

11. The method of claim 9, wherein upon detecting that the server version is incompatible with the first presence information collection script, the method further comprises:

applying a second presence information collection script to collect the presence information for the user.

12. A non-transitory computer readable medium having stored thereon instructions that, when executed by a processor, perform a method comprising:

collecting presence information from a first utility and a second utility associated with a user, wherein the presence information comprises time-based data;

comparing the first utility presence information with the second utility presence information;

determining, as a result of the comparison, to treat the first utility presence information and the second utility presence information as different or analogous events, wherein the analogous events provide redundant presence information; and selecting, via a processor, at least one instance of the redundant presence information to drop from a subsequent presence aggregation calculation for the user.

13. The non-transitory computer readable medium of claim 12, wherein only unique presence information from the redundant presence information is maintained for the subsequent presence aggregation calculation, wherein the method further comprises:

forwarding the unique presence information to a presence aggregator, wherein the presence aggregator is configured to calculate a resultant presence state for the user with the unique presence information and information collected from one or more other sources.

14. The non-transitory computer readable medium of claim 12, wherein the method further comprises:

associating the first utility presence information with a first priority and the second utility presence information with a second priority; and basing the selection of the at least one instance of the redundant presence information to drop on the first and second priority.

15. The non-transitory computer readable medium of claim 12, wherein the first utility is an email out-of-office utility, and wherein the second utility is a calendar application, the calendar application including one or more scheduled events.

16. The non-transitory computer readable medium of claim 15, wherein the match is detected between the first utility and the second utility presence information when the email out-of-office utility is active during at least a portion of the one or more scheduled calendar events.

17. The non-transitory computer readable medium of claim 12, wherein before collecting the presence information from the first and second utilities the method further comprises:

determining whether a server version associated with the user is compatible with a first presence information collection script; and updating a memory location associated with the user to reflect the determined server version.

18. The non-transitory computer readable medium of claim 17, wherein upon determining that the server version is compatible with the first presence information collection script the method further comprises:

applying the first presence information collection script to collect the presence information for the user.

19. A system for creating merged presence calculation information for determined analogous events, comprising:

a first utility configured to store, in memory, presence information associated with a user;

a second utility configured to store, in memory, presence information associated with the user; and a merged multi-utility presence module contained in memory and executed by a processor, wherein the merged multi-utility presence module is configured to collect presence information from the first utility and the second utility associated with the user, wherein the presence information comprises time-based data, compare the first utility presence information with the second utility presence information, determine, as a result of the comparison, to treat the first utility presence information and the second utility presence information as different or analogous events, wherein the analogous events provide redundant presence information, and select, via the processor, at least one instance of the redundant presence information to drop from a subsequent presence aggregation calculation for the user.

20. The system of claim 19, wherein the merged multi-utility presence module is further configured to maintain only unique presence information from the redundant presence information for the subsequent presence aggregation calculation, and wherein the first utility is an email out-of-office utility, and wherein the second utility is a calendar application including one or more scheduled calendar events.

* * * * *